(12) United States Patent
Jackman (10) Patent No.: US 6,770,115 B2
(45) Date of Patent: Aug. 3, 2004

(54) PROCESS FOR MAGNESIUM GRANULES

(75) Inventor: Joseph R. Jackman, New Castle, PA (US)

(73) Assignee: Remacor, Inc., West Pittsburgh, PA (US)

( * ) Notice: Subject to any disclaimer, the term of this patent is extended or adjusted under 35 U.S.C. 154(b) by 0 days.

(21) Appl. No.: 10/274,345

(22) Filed: Oct. 18, 2002

(65) Prior Publication Data

US 2004/0074339 A1 Apr. 22, 2004

(51) Int. Cl.⁷ ............................................. C22B 1/00
(52) U.S. Cl. ................................... 75/403; 134/2
(58) Field of Search ........................... 75/403; 134/2

(56) References Cited

U.S. PATENT DOCUMENTS

| | | |
|---|---|---|
| 2,299,043 A | 10/1942 | Stern |
| 2,852,418 A | 9/1958 | MacDonald |
| 3,598,573 A | 8/1971 | Freissmuth et al. |
| 3,656,735 A | 4/1972 | Eliot |
| 3,681,856 A | 8/1972 | Weisselberg et al. |
| 3,728,797 A | 4/1973 | Worden, Sr. et al. |
| 3,767,179 A | 10/1973 | Larson |
| 3,777,409 A | 12/1973 | Weisselberg et al. |
| 3,876,421 A | 4/1975 | Takemura |
| 3,929,464 A | 12/1975 | Todd et al. |
| 3,998,625 A | 12/1976 | Koros |
| 4,078,915 A | 3/1978 | Meichsner et al. |
| 4,137,072 A | 1/1979 | Kawakami et al. |
| 4,139,369 A | 2/1979 | Kandler et al. |
| 4,194,902 A | 3/1980 | Gmohling |
| 4,266,969 A | 5/1981 | Koros |
| 4,315,773 A | 2/1982 | Freissmuth et al. |
| 4,345,940 A | 8/1982 | Koros |
| 4,395,282 A | 7/1983 | Braun et al. |
| 4,592,777 A | 6/1986 | Rellermeyer et al. |
| 4,705,561 A | 11/1987 | Green |
| 4,708,737 A | 11/1987 | Skach, Jr. et al. |
| 4,764,211 A | 8/1988 | Meichsner et al. |
| 4,765,830 A | 8/1988 | Skach, Jr. et al. |
| 4,832,739 A | 5/1989 | Meichsner et al. |
| 5,021,086 A | 6/1991 | Luydkx et al. |
| 5,284,504 A * | 2/1994 | Barker et al. .................. 75/312 |
| 5,338,335 A | 8/1994 | Saxena |
| 6,352,570 B1 | 3/2002 | Bieniosek et al. |
| 6,372,014 B1 | 4/2002 | Bieniosek et al. |

FOREIGN PATENT DOCUMENTS

| | | |
|---|---|---|
| JP | 6-299260 | * 10/1994 |
| LU | 88 252 | 3/1994 |

OTHER PUBLICATIONS

*Case Histories Showing Why the Wyssmont TURBO–Dryer® is the Best*; Brochure CH9701 by Wyssmont Co., Inc., Fort Lee, New Jersey, no date.

* cited by examiner

Primary Examiner—Melvyn Andrews
(74) Attorney, Agent, or Firm—Fay, Sharpe, Fagan, Minnich & McKee (57) ABSTRACT

A method and apparatus of reclaiming magnesium from post consumer scrap and/or secondary magnesium turnings by feeding the post consumer scrap and/or secondary magnesium turnings into a rotary tray dryer and subjecting the post consumer scrap and/or secondary magnesium turnings to a controlled temperature and atmospheric environment to remove a substantial amount of liquid from the post consumer scrap and/or secondary magnesium turnings.

38 Claims, 3 Drawing Sheets

PROCESS FOR MAGNESIUM GRANULES

INCORPORATION BY REFERENCE

U.S. Pat. Nos. 3,598,573; 3,876,421; 3,929,464; 3,998,625; 4,078,915; 4,137,072; 4,139,369; 4,194,902; 4,266,969; 4,315,773; 4,345,940; 4,395,282; 4,592,777; 4,705,561; 4,708,737; 4,764,211; 4,765,830; 4,832,739; 5,021,086; 6,352,570; and 6,372,014; and Luxemburg Patent No. 88,252 are incorporated herein by reference as examples of desulfurization agents that could incorporate the use of the reclaimed magnesium of the present invention.

The present invention relates to an apparatus and method of recovering magnesium, and more particularly to the recovery of magnesium from magnesium turnings and chips for use in a desulfurization agent that desulfurizes molten iron.

BACKGROUND OF THE INVENTION

The sulfur content in iron ores and other materials commonly used in pig-iron production, i.e. coal and coke, have increased the costs of steel making. As a result, it is becoming increasingly desirable to desulfurize the pig-iron before the iron enters the basic oxygen furnace and/or steel making furnace. In addition, specifications for the sulfur content of finished steel are decreasing to extremely low levels to make high strength low alloy steel, and steels resistant to hydrogen induced cracking, among other applications requiring low sulfur contents. In combination with the economic benefits of blast furnace operations producing molten pig-iron with decreased sulfur contents, the desulfurization of molten pig-iron external to the blast furnace before the molten pig-iron enters the steel making furnace has become a practical necessity.

Over the years, a wide variety of materials and mixtures have been used to desulfurize pig-iron. It has long been known that various calcium compounds are good desulfurization agents. It has also been known that magnesium, alone or in combination with various alkaline metal oxides, is also a good desulfurization agent. There have been several patents which disclose the use of calcium oxide and magnesium as the primary desulfurization agents. (See Skach 4,765,830; Skach 4,708,737; Green 4,705,561; Kandler 4,139,369; Kawakami 4,137,072; Koros 3,998,625.) Furthermore, desulfurization agents disclosing the use of calcium carbide as the primary desulfurization agent have also been known and well documented. (See Freissmuth 3,598,573; Todd U.S. Pat. No. 3,929,464; Braun U.S. Pat. No. 4,395,282.)

The use of a desulfurization agent that includes magnesium and iron carbide or high carbon ferromanganese is disclosed in Luxemburg Patent No. 88,252 dated Jan. 3, 1999 and invented by Axel Thomas. The desulfurization agent disclosed in Thomas '252 includes a majority of iron carbide or high carbon ferromanganese. The desulfurization agent also includes magnesium, and one or more additives to improve the formed slag.

The use of a calcium compound and/or magnesium, in combination with a gas-producing compound, has also been used to increase the amount of sulfur removal. It has been found that the gas-producing compound releases a gas upon contact with the molten pig-iron to create a turbulent environment within the molten pig-iron. The released gas primarily breaks down agglomerations of the desulfurization agent and disperses the desulfurization agent throughout the molten pig-iron. The gas-producing agent is typically a hydrocarbon, carbonate or alcohol which has a tendency to release various amounts of gas upon contact with the molten pig-iron. Use of these various gas-producing agents is well documented. (See Takmura U.S. Pat. No. 3,876,421; Meichsner U.S. Pat. No. 4,078,915; Gmohling U.S. Pat. No. 4,194,902; Koros U.S. Pat. No. 4,266,969; Freissmuth U.S. Pat. No. 4,315,773; Koros U.S. Pat. No. 4,345,940; Green U.S. Pat. No. 4,705,561; Rellermeyer U.S. Pat. No. 4,592,777; Meichsner U.S. Pat. No. 4,764,211; U.S. Pat. No. Meichsner 4,832,739; and Luyckx U.S. Pat. No. 5,021,086.)

The use of compounds to increase the desulfurization efficiencies of magnesium particles are disclosed in Bieniosek U.S. Pat. No. 6,352,570 and Bieniosek U.S. Pat. No. 6,372,014. High melting temperature particles are combined with and/or coated onto the magnesium particles to delay the melting of the magnesium particles.

Desulfurization agents can contain various slag-forming agents. The importance of the slagging agent generally has been passed over for more immediate concerns about the economics of using various ingredients of the desulfurization agent. The composition of the slag can be important to retain the removed sulfur within the slag and not allow the sulfur to re-enter the molten pig-iron. Various slagging agents have been used for various purposes. In U.S. Pat. No. 4,315,773 a desulfurization agent comprising calcium carbide, a gas-involving compound, and fluorspar is disclosed. Fluorspar is used to modify the properties of the slag to prevent carbon dust production from igniting during the desulfurization. In U.S. Pat. No. 5,021,086, fluorspars are used to modify the characteristics of the slag increasing the fluidity of the slag during the desulfurization process.

Many of the above described desulfurization agents remove the desired amount of sulfur and other impurities from molten iron. However, in an industry constantly driven by margins, there remains a need for a more cost effective desulfurization agent. The magnesium component of the desulfurization agent is typically the highest-cost component. Domestically, magnesium powder can cost up to $1.80/lb. Foreign sources of magnesium cost less, typically about $0.79/lb. As a result, there has been some interest in using magnesium scrap. Magnesium scrap is available from rejected and process scrap in the form of machined chips which are common in the automobile and electronics industry. Over the past several years, the amount of generated magnesium scrap has increased due to the increased use of magnesium. Magnesium metal is commonly machined using mineral oil and oil/water emulsions resulting in waste magnesium chips and turnings and cutting fluid. The cutting fluid can constitute up to 35–50 weight percent of the waste material. The magnesium/liquid mixture typically cannot be disposed of due to the reactivity of magnesium with water. The large volume of cutting fluid in the magnesium/liquid mixture increases the transportation costs of the mixture. Due to the transport costs and/or processing problems of the magnesium/liquid mixture, the mixture is commonly burned instead of being reclaimed.

Some progress has been made concerning the recovery of magnesium from a magnesium/liquid mixture. Several of these processes are disclosed in U.S. Pat. Nos. 2,299,043; 2,852,418; 3,656,735; 3,767,179; and 5,338,335. In these processes, the water and oil in the magnesium/liquid mixture is burnt off in a rotary kiln. The substantially oil free magnesium chips are then remelted and formed and/or extruded into a final product. Solvents may be used to separate a portion of the cutting fluid from the magnesium chips prior to drying the magnesium chips. Although these processes are successful in reclaiming magnesium, the energy costs associated with the heating of the magnesium/ liquid mixture has not resulted in a cost effective process. In addition, combustion problems remain with the drying of the magnesium chips resulting in higher recovery costs. Furthermore, the oxidation of the magnesium during the drying process accounts for a significant loss of magnesium being reclaimed. Additional losses are encountered when using a solvent prior to drying.

Another process for reclaiming magnesium from a magnesium/liquid mixture is by pressing the mixture together to form a magnesium puck or briquette. This process can reduce the cutting fluid content of puck or briquette to about 7%. The squeezed out cutting fluid can be recycled and the transport costs of the magnesium in the form of a puck or briquette is significantly reduced. In addition, the puck or briquette can be more safely transported in such form. Although the compression process has several cost advantages, the cutting of fluid content of up to 7% poses problems for further processing of the compressed magnesium chips. Smelting of the magnesium pucks or briquettes is not feasible because of extreme flame and emissions generation. As a result, magnesium pucks or briquettes have not been accepted in the industry. In addition, the magnesium pucks or briquettes cannot be disposed of in land fills due to environmental and safety concerns.

In view of the present state of technology, there is a need for a lower cost and more effective process for recovering magnesium from magnesium scrap, which magnesium can be used in a wide variety of applications.

SUMMARY OF THE INVENTION

The present invention relates to an improved apparatus and method of recovering magnesium from magnesium scrap. The invention is particularly applicable to an apparatus and method of recovering magnesium from magnesium scrap for use in a desulfurization agent that desulfurizes molten iron and will be described with particular reference thereto; however, the invention has broader applications wherein the recovered magnesium can be extruded and/or remelted to form and/or be used in a variety of products that include magnesium metal (e.g., automotive parts, electronic components, etc.).

In accordance with the principal aspect of the present invention, the desulfurization agent for use in molten iron includes magnesium that has been at least partially reclaimed from magnesium scrap. In one embodiment of the present invention, a majority of the magnesium of the desulfurization agent is reclaimed from magnesium scrap. The magnesium scrap can be derived form a variety of sources. One common source is the automotive industry where many automotive components such as motors, gear boxes, steering wheels, etc. are made of or include magnesium; however, many other industries also generate magnesium scrap that can be used in the present invention (e.g., electronics industry, etc.). In addition, the magnesium scrap can come from post consumer scrap (PCS). It is estimated that over a million tons of magnesium scrap is generated by the automotive industry per year. Much of this magnesium scrap is mixed with oil and/or water. The oil and/or water functions as lubricant during the shaping and/or cutting of the magnesium during the formation of various components. Various prior art process have been developed to recycle magnesium scrap that includes oil. Several of these processes are disclosed in U.S. Pat. Nos. 2,299,043; 3,656,735; 3,767,179; and 5,338,335, which are incorporated herein by reference. In these processes, the water and oil in the magnesium/liquid mixture is thermally removed by burning off the oil and water in a heated rotary kiln. The substantially liquid free magnesium chips are then remelted and formed and/or extruded into a final product. Although these processes are successful in reclaiming magnesium which can be used in the present invention, the energy costs associated with the heating of the magnesium/liquid mixture remains a significant cost for the magnesium recovery. In addition, the heated magnesium frequently ignites resulting in down time and/or loss of magnesium product, and/or damage to the processing equipment. The heating and drying of the magnesium chips also results in significant amounts of oxidation of the magnesium, thereby resulting in loss of final magnesium product. The magnesium yields using standard drying techniques are typically no more than about 50%, and the analysis of the magnesium product includes typically no more than about 80–85% magnesium. The apparatus and method of the present invention utilizes a novel drying process for recovered magnesium which substantially eliminates oil and/or water that is combined with the magnesium chips. In accordance with one embodiment of the invention, a rotary tray dryer is used to at least partially dry the magnesium chips. The rotary tray dryer has been found to more efficiently dry the magnesium chips as compared with previously used rotary drum dryers or auger type dryers. The cost savings in using the rotary drum dryer for the magnesium chips results in an economically viable process for reclaiming magnesium from recycled magnesium. In one aspect of this embodiment, the rotary tray dryer is a continuous rotary tray dryer. In one non-limiting design, the continuous rotary tray dryer receives magnesium chips that include liquid such as, but not limited to, solvents, oil, water and the like. The magnesium chips are fed on a top tray of the rotary tray dryer, typically through an inclined chute. While the magnesium chips are on the trays, the trays are rotated and the magnesium chips are exposed to a heated gas environment, which heated gas is used to at least partially remove the liquid from the magnesium chips. In another and/or alternative aspect of this embodiment, the rotary tray dryer includes a plurality of rotary trays. In one non-limiting design, the magnesium chips are transferred from tray to tray by passing the magnesium through chutes which extend between vertically adjacent trays. Upon rotation of the trays, wiper arms associated with each tray guide the magnesium chips over the laterally outer edges of the trays and into the upper ends of the chutes, while additional wiper arms and leveler arms associated with each tray distribute the magnesium chips transferred to the tray from the next highest tray evenly over the surface of the tray. One such rotary tray dryer that can be used is disclosed in U.S. Pat. Nos. 3,681,855; 3,728,797 and 3,777,409, which are incorporated herein by reference. In another and/or alternative non-limiting design, the rotary tray dryer is operated such that the magnesium chips are transferred between vertically adjacent trays at intervals of from about 1 minute to about one hour; however, other time intervals can be used. The total time the magnesium chips are resident in the rotary tray dryer is generally between about 2 minutes to four hours, and typically about 0.5–3 hours; however, other resident times can be used. In still another and/or alternative aspect of this embodiment, the rotary tray dryer includes a sufficient number of trays to provide a residence time for the magnesium chips to be sufficiently dried. In one non-limiting design, the rotary tray dryer includes 1–10 trays, and typically about 2–5 trays; however, other tray numbers can be used. In yet another and/or alternative aspect of this embodiment, the temperature within the rotary tray dryer is maintained sufficiently high to dry the magnesium chips; however, is maintained at a sufficiently low level to reduce loss of magnesium (e.g., oxidation of the magnesium, etc.) and to prevent the magnesium from melting. The temperature is also selected so that special costly components need not be used which would unduly increase the costs of recovering the magnesium. In addition, the temperature is selected so as not be too high resulting in undue high energy costs to dry the magnesium chips. The typical liquid components mixed with the magnesium chips are water and cutting fluid. Water has a boiling point of about 212° F. (100° C.) and the cutting fluid has a boiling point typically ranging from about 100–250° F. (38–121° C.). In one non-limiting design, the average temperature in the rotary tray dryer is about 250–1150° F. (121–622° C.), typically about 250–1000° F. (121–538° C.), and more typically about 350–700° F. (176–372° C.); however, other temperatures can be used. In still yet another and/or alternative aspect of this embodiment, the rotary tray dryer is heated by a heater such as, but not limited to, an electric heater, a gas burning heater, a oil burning heater, heating coils, and/or the like. In a further aspect of this embodiment, the rotary tray dryer can be operated under subatmospheric, atmospheric or superatmospheric pressure. In one non-limiting design, the rotary tray dryer is operated at atmospheric or sightly above atmospheric pressure. In still a further and/or alternative aspect of this embodiment, the rotary tray dryer reduces the liquid content of the magnesium chips to less than about 5 weight percent, and typically less than about 3 weight percent, and more typically less than about 2 weight percent, and even more typically less than about 1 weight percent. In still a further and/or alternative aspect of this embodiment, the rotary tray dryer reduces the liquid content of the magnesium chips by at least about 50%, typically at least about 75%, more typically at least about 85%, and still more typically at least about 90%.

In another and/or alternative aspect of the present invention, the internal atmosphere of the rotary tray dryer is maintained so as to limit or prevent combustion of the magnesium and/or other components in the rotary tray dryer. The common reactions that can take place which cause a fire or explosion in the rotary tray dryer include:

1.

2.

In addition to these two reactions, the hydrocarbons in the rotary tray dryer can combust in the proper atmosphere. When combustion of the magnesium occurs, magnesium recovery is reduced as indicated by the two above reactions. Once a fire has started, the magnesium is lost due to vaporization, melting, oxidation and/or the like. In addition, the rotary tray dryer may have to be stopped to terminate the fire, thereby reducing the amount of magnesium recovered over a period of time, and increasing the costs of magnesium recovery. The combustion in the rotary tray dryer may also result in damage to the rotary tray dryer resulting in significant down times and significant repair costs. When combustion of the oil, solvents and/or other hydrocarbons occurs, magnesium recovery is reduced and the magnesium recovery costs are increased for similar reasons. In one embodiment, the amount of oxygen in the rotary tray dryer is controlled during the drying process to limit or prevent combustion of the materials from occurring in the rotary tray dryer. The limiting of the oxygen content also reduces the amount of oxidation of the magnesium, thereby increasing magnesium recovery efficiencies. The oxygen content in the rotary tray dryer can be controlled in a number of ways such as, but not limited to, continuous oxygen removal and/or purging, insertion of non-oxygen gasses into the rotary tray dryer, and/or the like. In one aspect of this embodiment, the oxygen level in the rotary tray dryer is maintained at less than about 5 volume percent, typically up to about 4 volume percent, more typically up to about 3 volume percent, still more typically up to about 2.44 volume percent, still even more typically up to about 2 volume percent, yet still even more typically about 0–1.8 volume percent, still yet even more typically about 0.7–1.5 volume percent. In another and/or alternative embodiment of the invention, the amount of hydrogen and/or hydrocarbons in the rotary tray dryer is controlled during the drying process to limit or prevent combustion of the materials from occurring in the rotary tray dryer. Hydrogen gas is produced from the hydrocarbons that are vaporized during the drying of the magnesium. The hydrogen and/or hydrocarbon content in the rotary tray dryer can be controlled in a number of ways such as, but not limited to, continuous hydrogen and/or hydrocarbon removal and/or purging, insertion of non-hydrogen and/or hydrocarbon containing gasses into the rotary tray dryer, and/or the like. In one aspect of this embodiment, the hydrogen level in the rotary tray dryer is maintained at less than about 2.5 volume percent, typically up to about 1.5 volume percent, more typically up to about 1 volume percent, still more typically about 0–0.99 volume percent, still even more typically about 0–0.9 volume percent. In still another and/or alternative embodiment of the invention, the oxygen, hydrogen and/or hydrocarbon content within the rotary tray dryer is at least partially controlled by the introduction of an inert gas into the rotary tray dryer. The inert gas is typically selected so as not to 1) be flammable, 2) substantially react with magnesium, 3) form noxious compounds in the rotary tray dryer, 4) form a sediment in the rotary tray dryer and/or on the magnesium, 5) be toxic, 6) be environmentally unfriendly, and/or 7) damage the components of the rotary tray dryer. The inert gas should also be selected so as not to add significant cost to the drying of the magnesium. In one aspect of this embodiment, the inert gas includes one or more noble gases. In one non-limiting arrangement, a majority of the inert gas is one or more noble gases. In another and/or alternative arrangement, the inert gas is principally a single noble gas. In still another and/or alternative arrangement, the inert gas is at least 90 volume percent argon.

In still another and/or alternative aspect of the present invention, excess fluid is removed from the magnesium chips prior to drying the magnesium chips. The liquid content of the magnesium chips will vary from source to source. The liquid content can be as high as about 50 weight percent or more, and is typically about 25–48 weight percent liquid. The removal of some of this liquid by non-drying techniques can reduce the drying time and energy costs associated with the high liquid content mixture. In one embodiment, the magnesium chips and liquid are transported to screens which allow some of the liquid to flow through the screens to be separated from the magnesium chips. The magnesium chips and liquid can be transported to the screens by a number of different techniques such as, but not limited to, pumps, augers, conveyors, and/or the like. In another and/or alternative aspect of this embodiment, the screen size is selected to substantially prevent the magnesium chips from passing through the screens. Typically, the mesh size of the screen is about 50–400 U.S. standard mesh, more typically about 100–400 U.S. standard mesh, even more typically about 120–325 U.S. standard mesh, still even more typically about 140–325 U.S. standard mesh, and yet even more typically about 200–325 U.S. standard mesh. In another and/or alternative embodiment, the magnesium chips and liquid are transported to a chip-wringer or cyclonic separator to separate the excess liquid from the magnesium chips. In still another and/or alternative aspect of the present invention, at least about 1 weight percent of the excess liquid is separated from the magnesium chips. In one aspect of this embodiment, at least about 2 weight percent of the excess liquid is separated from the magnesium chips. In another and/or alternative aspect of this embodiment, at least about 3 weight percent of the excess liquid is separated from the magnesium chips. In still another and/or alternative aspect of this embodiment, at least about 4 weight percent of the excess liquid is separated from the magnesium chips. In yet another and/or alternative aspect of this embodiment, at least about 5–20 weight percent of the excess liquid is separated from the magnesium chips.

In yet another and/or alternative aspect of the present invention, the recovered magnesium is included in a desulfurization agent to remove sulfur from molten ferrous materials such as, but not limited to, molten pig-iron, ferro-silicon alloy, etc. Typically, the desulfurization agent is a solid material at least at ambient temperature (i.e. 70° F.). The solid desulfurization agent is formulated to maintain its solid form until at least just prior to being combined with the molten ferrous materials. The desulfurization agent is formulated to minimize the introduction of undesired materials, such as sulfur, into the molten iron during the desulfurization process. The desulfurization agent includes magnesium, and optionally one or more other agents that can facilitate in the removal of sulfur from the molten ferrous material. Such one or more agents include, but are not limited to a calcium compound, and/or a gas-producing compound. In one embodiment of the present invention, the calcium compound is selected to readily react with sulfur in the molten iron. The calcium compound can be a single calcium compound or a combination of two or more calcium compounds. In one aspect of this embodiment, various calcium compounds can be used such as, but not limited to, calcium carbide, calcium carbonate, calcium chloride, calcium cyanamide, calcium iodide, calcium nitrate and/or calcium nitrite. In one non-limiting formulation, the calcium compound primarily includes calcium oxide, calcium carbonate, and/or calcium carbide. In one aspect of this embodiment, the calcium compound constitutes at least about 1 weight percent of the desulfurization agent. In another and/or alternative embodiment of the present invention, the magnesium, other than the reclaimed magnesium, is included in the desulfurization agent. Such magnesium includes powdered ore magnesium, magnesium alloy and/or a magnesium compound. In one aspect of this embodiment, the total magnesium content constitutes at least about 5 weight percent of the desulfurization agent. In still another and/or alternative embodiment of the present invention, the gas-producing compound is selected to enhance the desulfurization efficiencies of the desulfurization agent. The gas-producing compound forms a gas upon contact with molten iron. The produced gas at least partially mixes the various components of the desulfurization agent throughout the iron to facilitate in enhancing the reaction between the various desulfurization agents and the sulfur in the molten iron. The produced gas can also facilitate in the breakup, mixing, and dispersement of the desulfurization agent in the molten iron so as to facilitate in increasing the active sites available for reaction with the sulfur, thereby further increasing the efficiency of sulfur removal from the molten iron. In one aspect of this embodiment, the gas-producing compound includes, water, hydrocarbons, alcohols, and/or carbonates. In another and/or alternative aspect of this embodiment, the gas-producing compound can be a liquid and/or a solid material. In one non-limiting formulation, the gas-producing material includes a solid compound such as, but not limited to, coal, plastic, rubber, solid hydrocarbons, solid alcohols, solid nitrogen containing compounds, solid esters and/or solid ethers. In another and/or alternative non-limiting formulation, the gas-producing material includes a liquid compound such as, but not limited to, liquid hydrocarbons. The liquid hydrocarbon can be saturated or unsaturated, halogenated or unhalogenated. In still another and/or alternative aspect of this embodiment, the gas-producing compound constitutes at least about 0.1 weight percent of the desulfurization agent. In one non-limiting formulation, the gas-producing compound constitutes at least about 1 weight percent of the desulfurization agent.

In yet another and/or alternative aspect of the present invention, the desulfurization agent is at least partially coated with a heat absorbing compound. The heat absorbing compound is formulated to absorb heat around the desulfurization agent. In one embodiment of the present invention, the heat absorbing compound is formulated to absorb heat about and/or closely adjacent to the desulfurization agent to increase the time the desulfurization agent remains in the molten iron for reaction with sulfur and/or to increase the reaction rate of the desulfurization agent. In another and/or alternative embodiment of the present invention, the desulfurization agent is pre-coated with the heat absorbing compound or coated with the heat absorbing compound just prior to being added to the molten iron. In still another and/or alternative embodiment, the particle size of the desulfurization agent is larger than the average particle size of the heat absorbing compound. In one non-limiting design, the heat absorbing compound constitutes at least about 1 weight percent of the coated desulfurization particle, typically at least about 2 weight percent, and more typically about 2–30 weight percent. In still another and/or alternative embodiment of the present invention, the particles of heat absorbing compound can form a blend and/or conglomeration with a single or a plurality of particles of desulfurization agent. In yet another and/or alternative embodiment of the present invention, the heat absorbing compound includes solid carbide compounds and/or ferroalloys. In one aspect of this embodiment, the carbide compound and/or ferroalloy has a higher melting point than the desulfurization agent. In still another and/or alternative aspect of this embodiment, the carbide compound and/or ferroalloy endothermically reacts and/or disassociates in the molten iron thereby absorbing heat. In still yet another and/or alternative embodiment of the present invention, at least a portion of the particles of heat absorbing compound are at least partially bonded to the particle surface of the desulfurization agent by a bonding agent.

In accordance with still yet another and/or alternative aspect of the present invention, the desulfurization agent is injected into molten iron by a lance. The melting of the components of the desulfurization agent in the transport pipe of the lance can be at least inhibited or overcome by mixing the desulfurization agent with and/or including in the desulfurization agent high melting temperature particles. The high melting temperature particles are designed to absorb heat as the high melting temperature particles and the magnesium particles are transported through the lance and into the molten iron. The absorption of heat by the high melting temperature particles inhibits or prevents the components of the desulfurization agent from melting or completely melting prior to being injected into the molten iron. By inhibiting the melting of the components of the desulfurization agent in the lance, the problems associated with plugging of the lance are reduced or overcome. In one embodiment of the present invention, the high melting temperature alloy particles are made up of two or more of the following metals namely, aluminum, antimony, beryllium, boron, calcium, chromium, copper, iron, magnesium, manganese, nickel, rare earth metals, silicon, silver, sodium, strontium, tin, titanium, vanadium, zinc, zirconium, and mixtures thereof. The specific composition of the high melting temperature particles is selected to obtain the desired heat absorbing characteristics of the particles when used in combination with the magnesium particles. The specific composition of the high melting temperature particles is also typically selected to minimize contamination of the molten iron. In another and/or alternative embodiment, the average melting temperature of the high melting temperature particles is about 2200° F.

In accordance with a further and/or alternative aspect of the present invention, the molten iron is shielded from the atmosphere during the desulfurization process. In one embodiment of the present invention, the shielding takes the form of creating an inert and/or non-oxidizing environment about the molten iron. The inert and/or non-oxidizing environment can be formed by placing the molten iron in a chamber filled with inert and/or non-oxidizing gas and/or by flowing an inert and/or non-oxidizing gas over the top of the molten iron during desulfurization. The inert and/or non-oxidizing environment inhibits or prevents oxygen from contacting the molten iron and oxidizing various components of the desulfurization agent and/or from reacting with the molten iron during desulfurization. Inert and/or non-oxidizing gases, which can be used to form the inert and/or non-oxidizing environment include, but are not limited to, helium, nitrogen, argon, and natural gas.

In accordance with still a further and/or alternative aspect of the present invention, a secondary calcium compound is co-injected with the desulfurization agent to assist in the removal of sulfur from the molten iron. The secondary calcium compound is selected to react with sulfur in the molten iron. Various calcium compounds can be used such as, but not limited to, calcium oxide, calcium carbide, calcium carbonate, calcium chloride, calcium cyanamide, calcium iodide, calcium nitrate, diamide lime, and calcium nitrite. In one embodiment of the present invention, the secondary calcium compound disassociates and the calcium ion forms in the molten iron so as to be available to react with the sulfur. The secondary calcium compound may or may not have a melting point which is less than the temperature of the molten iron. In another and/or alternative embodiment of the present invention, the secondary calcium compound is selected such that the ions previously associated with the calcium ion do not adversely affect the desulfurization process. In one aspect of this embodiment, the secondary calcium compound includes calcium oxide, calcium carbonate, and/or calcium carbide. In still another and/or alternative embodiment of the present invention, the particle size of secondary calcium compound is selected to provide the necessary reactivity or activity of the secondary calcium compound with the sulfur in the molten iron. When the particle size is too large, fewer calcium ions will be produced, resulting in poorer desulfurization efficiencies. In one aspect of this embodiment, the particle size of the secondary calcium compound is an average particle size of about 14 to about 500 U.S. Standard Mesh, typically about 14 to about 325 U.S. Standard Mesh, more typically about 16 to about 200 U.S. Standard Mesh, even more typically about 16 to about 100 U.S. Standard Mesh, still even more typically about 18 to about 100 U.S. Standard Mesh, and yet even more typically about 18 to about 50 U.S. Standard Mesh.

In accordance with yet a further and/or alternative aspect of the present invention, a slag-improvement agent is added to and/or co-injected with the desulfurization agent to generate a more fluid slag and/or to reduce the amount of liquid iron entrapped within the slag. Various slag-improvement agents can be used such as, but not limited to, metallurgical and/or acid grade fluorspar, dolomitic lime, silica, sodium carbonate, sodium chloride, potassium chloride, potash, cryolite, potassium cryolite, colemanite, calcium chloride, calcium aluminate, sodium fluoride, anhydrous borax, nepheline syenite, and/or soda ash. In one embodiment, a metallurgical and/or acid grade fluorspar is used such as, but not limited to, calcium fluoride. Metallurgical and/or acid grade fluorspar causes desired modifications to the physical properties of the slag. The amount of slag-improvement agent is selected to improve the slag characteristics without unduly reducing the viscosity of the slag, whereby the sulfur can easily transfer back into the molten iron.

In accordance with still yet a further and/or alternative aspect of the present invention, the desulfurization agent is injected beneath the surface of the molten iron, such as molten pig-iron. The desulfurization agent can be injected such that the coated desulfurization agent is injected by itself into the molten iron, injected with other components of the desulfurization agent, or co-injected with other components of the desulfurization agent. In one embodiment of the present invention, the components of the desulfurization agent are fluidized prior to being injected into the molten iron. In one aspect of this embodiment, the desulfurization agent is fluidized in a semi-dense state before being injected into the molten iron. The fluidized desulfurization agent is carried into the molten iron by a carrier gas. In another and/or alternative aspect of this embodiment, the carrier gas is inert and/or non-oxidizing to the components of the desulfurization agent. Carrier gases that can be used are, but not limited to, argon, nitrogen, helium, natural gas or various other inert and/or non-oxidizing gases.

The primary object of the present invention is the provision of an apparatus and method of reclaiming magnesium scrap and to reuse the reclaimed magnesium.

Another object of the present invention is the provision of an apparatus and method of reclaiming magnesium scrap that is economical and feasible.

Still another and/or alternative object of the present invention is the provision of an apparatus and method of reclaiming magnesium scrap that incorporates the use of a novel drying system.

Yet another and/or alternative object of the present invention is the provision of an apparatus and method of reclaiming magnesium scrap that reduces the incidents of combustion during the reclamation process.

Still yet another and/or alternative object of the present invention is the provision of an apparatus and method of reclaiming magnesium scrap which scrap can be reformed and/or remelted to be formed into a magnesium containing component for various types of industries (e.g., automotive, electronic, etc.).

A further and/or alternative object of the present invention is the provision of an apparatus and method of reclaiming magnesium scrap which scrap can be use as the sole component or one of the components of a desulfurization agent.

Still a further and/or alternative object of the present invention is the provision of a desulfurization agent that increases the efficiency of desulfurization of iron.

These and other objects of the invention will become apparent to those skilled in the art upon reading and understanding the following detailed description of preferred embodiments taken together with the drawings.

BRIEF DESCRIPTION OF THE DRAWINGS

The invention may take physical form in certain parts and arrangement of parts preferred embodiments of which will be described in detail and illustrated in the accompanying drawings which form a part hereof and wherein.

DESCRIPTION OF THE PREFERRED EMBODIMENTS

Figure 1:
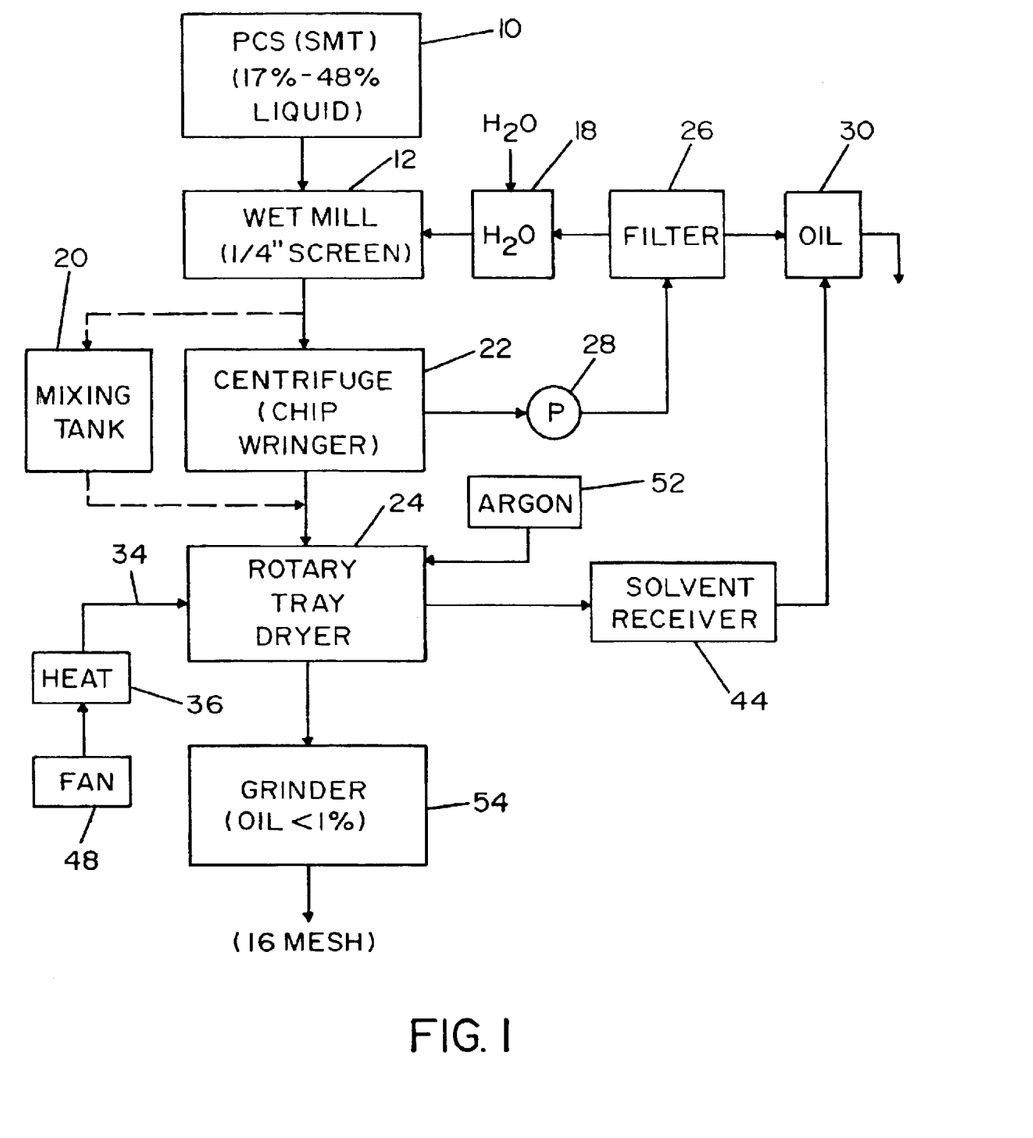
FIG. 1 is a flow chart illustrating the process steps for recovering magnesium from magnesium scrap.

Referring to the drawings, wherein the showings are for the purpose of illustrating the preferred embodiments of the invention only and not for the purpose of limiting same, FIG. 1 illustrates the improved process for recovering magnesium from magnesium scrap in accordance with the present invention. The demand for magnesium continues to grow in popularity as a substitute for steel and aluminum products. As more products are produced with magnesium, the amount of magnesium scrap has correspondently increased. Magnesium metal is commonly machined with the use of cutting fluids. The cutting fluids are typically used to increase the life of the cutting tools. As a result, the magnesium scrap from such processes constitutes a mixture of magnesium turnings or chips and cutting fluid. The cutting fluid commonly includes mineral oil, water and other lubricants. The mixture of magnesium and cutting fluid has posed significant handling and recycling problems due to the volume and weight of the mixture, and the instability of the mixture. Indeed, the mixture can contain up to 50 weight percent or more liquid. The present invention is an improved process for recovering magnesium from this magnesium scrap. The reclaimed magnesium has a very low liquid content and high magnesium content, thus the reclaimed magnesium can be extruded into magnesium containing components and/or remelted to be formed into magnesium containing components. The reclamation process of the present invention is more efficient, more effective, and less costly as compared with present reclamation processes.

Referring now to FIG. 1, post consumer scrap (PCS) and/or secondary metal turnings (SMT) 10 that include magnesium are collected from various manufacturers and/or other facilities. A few sources of PCS include electronic equipment, appliances, used automotive parts and the like. The PCS typically does not include a high liquid content (e.g. less than about 15 weight percent); however, the magnesium in the PSC is commonly mixed with other metals. One primary source of SMT is from the manufacture of automotive parts. The SMT typically includes a high liquid content (up to 50 or more weight percent) due to the use of cutting fluid during the manufacture of the automotive parts. FIG. 1 illustrates that the PCS and SMT to be processed includes about 17–48 weight percent liquid; however, the liquid content can be more or less. The collected PCS and/or SMT typically are sorted prior to being wet milled 12: however this is not required. The sorting process is used to remove undesired materials from the PCS and/or SMT (e.g., ferrous materials, plastic, glass, etc.). A magnet can be used to facilitate in the removal of ferrous material from the PCS and/or SMT. Glass, plastic and/or other undesired materials can be removed by visual inspection. The PCS and/or SMT can also be pre-sorted by size prior to the wet mill process; however, this is also not required. Very large pieces and/or smaller pieces of PCS and/or SMT can be removed prior to the wet mill process.

Figure 2:
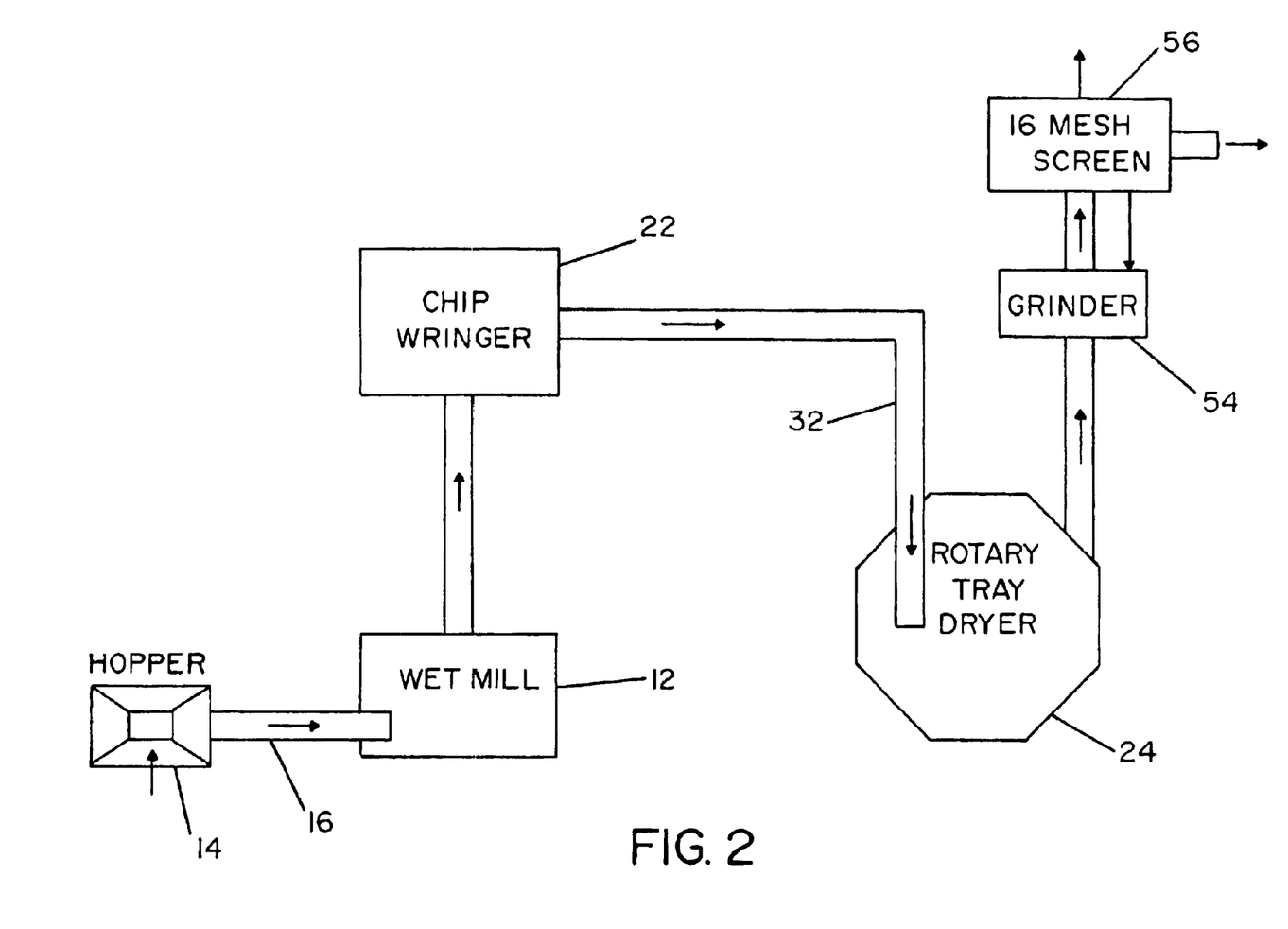
FIG. 2 is a simplified diagram of the process steps for recovering magnesium from magnesium scrap as illustrated in FIG. 1; and, FIG. 3 is a diagram illustrating the basic operation of a rotary tray dryer.

After the PCS and/or SMT has been dumped into a hopper 14 and/or other holding container, the PCS and/or SMT is fed to the wet milling process as illustrated in FIGS. 1 and 2, typically by a feed belt 16; however, other feeders can be used (e.g. auger, pump, etc.). The wet milling process is designed to reduce the size of the PCS and/or SMT for further processing. The wet milling process typically includes a hammer mill that drives the PCS and/or SMT through a ¼ screen and into a mixing tank. As can be appreciated, the size of the screen can be larger or smaller. Typically, the magnesium contained in the PCS and/or SMT is less than about 3" due to prior processing; however, this is net required. Water is typically added from a water reservoir 18 during the grinding process to facilitate in the sizing of the PCS and/or SMT. A hammer mill is typically used to reduce the incidence of combustion of the magnesium during the milling process; however, other grinding processes can be used. As can be appreciated, if the magnesium in the PCS and/or SMT is smaller than the screen size being used in the wet mill, the PCS and/or SMT can be directly fed into the mixing tank 20 without being subjected to the wet mill.

The PCS and/or SMT in the mixing tank is then transferred to a chip wringer 22 or continuous centrifuge to remove excess liquid from the magnesium. Typically the PCS and/or SMT are pumped from the mixing tank and into liquid separating screens and then into a cyclonic separator. The liquid separating screens initially remove the excess liquid from the magnesium and additional excess liquid is removed from the magnesium in the chip wringer or centrifuge. The amount of liquid typically removed from the PCS and/or SMT is at least about 5 weight percent. Typically, the liquid content of the PCS and/or SMT prior to entering the rotary tray dryer 24 is less than about 40 weight percent, typically less than about 35 weight percent, more typically less than about 30, even more typically less than about 25 weight percent, and still even more typically less than about 15 weight percent. The composition of the liquid that is associated with the PCS and/or SMT is generally about 1–20 weight percent water and about 80–99 weight percent oil and/or solvent; however, other liquid compositions may exist. As can be appreciated, the liquid separating screens can be the sole process used to separate the excess liquid from the magnesium prior to drying the magnesium. Alternatively, the chip wringer or centrifuge can be the sole process to separate the excess liquid from the magnesium prior to drying the magnesium. The collected excess liquid is transported to a filtering system 26 by a pump 28 and/or other device. The filter system is used to at least partially separate the water from other liquid components (e.g., oil, solvents, etc.) The filtered water can then be transported to the water reservoir that is used to supply water to the wet milling process and/or disposed of. The oil 30, solvent, etc. that is filtered from the water in the filter system is transported to an oil recovery facility wherein the oil, solvent, etc. is recycled and/or disposed of.

Figure 3:
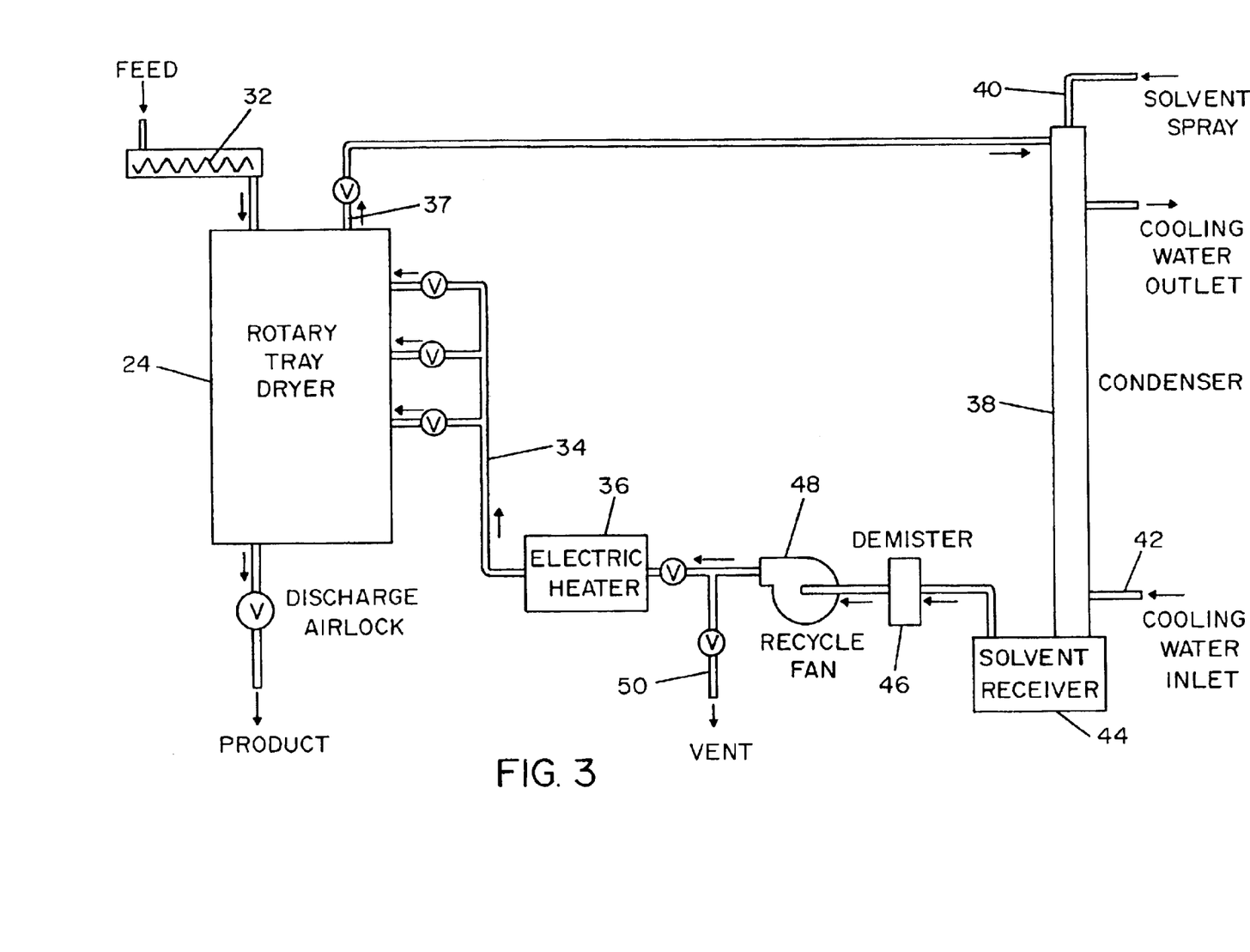

Referring now to FIGS. 1 and 3, the PCS and/or SMT is transported to the rotary tray dryer from the chip wringer by a conveyor, auger, or the like 32. A variable speed auger feeder is typically used to maintain a constant feed rate to the rotating drying tray. Each tray of the rotary tray dryer typically has at least one stationary bed leveler and a tray wiper. Each bed leveler is designed to spread the pile of PCS and/or SMT evenly on its respective tray so that it may be uniformly dried. Each tray rotates at a predetermined speed. Typically the trays rotate at the same speed; however, this is not required. After each tray rotates a predetermined distance, each respective tray wiper transfers the PCS and/or SMT through a respective opening to the next lower tray. After the drying is completed on the last tray, the PCS and/or SMT is transferred through an opening and transported to the next processing step. The rotary tray dryer provides continuous, automatic operation, thus requires little maintenance. The rotary tray dryer also provides relatively precise control of the drying temperature and the residence time of the PCS and/or SMT, as well as adjustable and automatically maintained drying. The specifications of the rotary tray dryer are selected based on the volume of PCS and/or SMT to be processed. The rotary tray dryer is typically a 2–10 rotary tray dryer wherein the trays are vertically spaced from one another. As can be appreciated, more trays can be used. The trays are typically designed to rotate about a central axis of the rotary tray dryer. A heated stream of gas 34 is introduced into the rotary tray dryer to heat the interior of the rotary tray dryer by convection. The interior temperature of the rotary tray dryer is maintained at about 300–800° F. (148–427° C.), and typically about 550–600° F. (287–316° C.). The resident time of the PCS and/or SMT in the rotary tray dryer is about 0.5–5 hours, and typically about 1–3 hours. The PCS and/or SMT is continuously fed onto the top tray of the rotary tray dryer and is thereafter distributed on the top tray at a generally uniform thickness of at least about 0.5 inch, and typically about 0.5–3 inches. The gas that is introduced into the rotary tray dryer is heated by an electric heater 36; however, other types of heaters can be used. The heated gas is used to heat the PCS and/or SMT in the rotary tray dryer, thereby vaporizing and removing the liquid on the PCS and/or SMT. The heated gas and the vaporized liquid are removed from the top 37 of the rotary tray dryer and transported into a condenser 38. In the condenser, the gas and vaporized liquid are cooled and the vaporized liquid is removed from the gas. A solvent spray 40 (e.g., water) may be used to facilitate in the removal of the vaporized liquid from the gas. The condenser is cooled by cooling water 42 or some other cooling fluid. The condensed vapor is collected in the solvent receiver 44 at the base of the condenser. The collected liquid in the solvent condenser can be filtered and recycled and/or disposed of as illustrated in FIG. 1. The gas from the condenser is passed through a demister 46 to further filter out any solvent, water, hydrocarbons and/or other liquids in the gas stream. A recycle fan 48 blows the gas from the demister through the electric heater and into the rotary tray dryer. A portion of the gas can be vented 50 out or additional gas can be added to the system as needed by use of the valves.

The type of gas that is inserted into the rotary tray dryer is selected to limit or prevent combustion of the magnesium and/or other components in the rotary tray dryer. Composition can occur from the reaction of the magnesium with water and/or oxygen, and/or combustion of the hydrocarbons in the rotary tray dryer. The gas is also selected to not adversely react with the compounds in the rotary tray dryer. An argon gas 52 is typically used to dry the PCS and/or SMT in the rotary tray dryer. Argon is an inert gas that does not react with any of the components in the rotary tray dryer. The flow rate of the argon through the rotary tray dryer is selected so as to control the amount of oxygen, hydrogen and/or hydrocarbon vapor or gas in the rotary tray dryer. Typically the flow rate of the argon into the rotary tray dryer is sufficient to limit the oxygen content in the rotary tray dryer to less than about 3 volume percent, and typically less than about 2.44 volume percent, and/or to limit the hydrogen and/or hydrocarbon content in the rotary tray dryer to less than about 1.5 volume percent, and typically less than about 1 volume percent. By controlling the oxygen and/or hydrogen content in the rotary tray dryer to these low limits, the incidence of combustion in the rotary tray dryer is significantly reduced. The rotary tray dryer can have a number of different configurations. One type of rotary tray dryer that can be used is disclosed in U.S. Pat. Nos. 3,681,855; 3,728,797 and 3,777,409, which are incorporated herein by reference, thus further details concerning the configuration and operation of the multi-tray dryer need not be further set forth.

The dried PCS and/or SMT has a liquid content of less than about 2 weight percent, typically less than about 1 weight percent, more typically less than about 0.5 weight percent, and even more typically less than about 0.1 weight percent. The dried PCS and/or SMT is substantially water-free. The dried PCS and/or SMT is then transported by conveyor, auger, etc. to a separator and/or grinder 54. As the dried PCS and/or SMT is being transported from the rotary tray dryer, the dried PCS and/or SMT can be cooled by cooling screws or the like; however, such cooling is not required. The separator, if used, removes some of the remaining undesired material such as ferrous material. Such a separation can be done manually and/or by the use of a magnet. The dried PCS and/or SMT is typically screened 56 using a 16 U.S. stand mesh screen and subsequently ground so that a majority of the magnesium particles is about 30–80 U.S. standard mesh, and typically about 40–60 U.S. standard mesh. The magnesium percentage in the dried PCS and/or SMT is about 85.4–93%, and about 59–84% of the feed material was recovered as dried PCS and/or SMT. The same feed material using prior reclamation processes resulted in the magnesium percentage in the dried PCS and/or SMT of about 85%, and about 55% of the feed material was recovered as dried PCS and/or SMT. The reclamation process of the present invention results in a 4–29% increase in finished product recovery rate of magnesium as compared with prior processes. In addition, the percentage of magnesium in the finished product is about 0.4–7% greater than in prior processes. The increase in recovery rate and magnesium percentage is a significant improvement over prior reclamation processes. The ground magnesium can then be used as or a component of a desulfurization agent to remove sulfur from molten iron. Alternatively, the ground magnesium can be remelted or extruded to form magnesium containing components.

When the magnesium is to be used as a component of a desulfurization agent, the magnesium is commonly added to and/or co-injected with a calcium compound. The calcium compound is formulated to react with sulfur in the molten iron to form calcium sulfide in the slag layer. Typically, the desulfurization agent is added to pig-iron; however, the molten iron can be other types of iron. The particles of calcium compound which do not react with sulfur migrate into the slag layer. The magnesium vaporizes upon contact with the molten iron to form magnesium vapor bubbles. The vapor bubbles create turbulence in the molten iron as the vapor bubbles migrate up through the molten iron and through the slag layer. The turbulence caused by the vapor bubbles increases the sulfur removal efficiency by the desulfurization agent. A hydrocarbon containing compound can be added to the desulfurization agent to increase the turbulence during the desulfurization process.

The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations in so far as they come within the scope of the appended claims.

Having thus described the invention, it is claimed:

1. A method of reclaiming magnesium from post consumer scrap and/or secondary magnesium turnings comprising:
   a) continuously feeding said post consumer scrap and/or secondary magnesium turnings into a rotary tray dryer, said post consumer scrap and/or secondary magnesium turnings including magnesium and a liquid, said liquid including water, hydrocarbon compound, or mixtures thereof;
   b) operating said rotary tray dryer so as to provide an internal temperature of at least about 250° F., a substantially non-combustive internal atmosphere, and a residence time of at least about 0.5 hour for said post consumer scrap and/or secondary magnesium turnings; and,
   c) at least partially removing said liquid from said post consumer scrap and/or secondary magnesium turnings.

2. The method as defined in claim 1, wherein said non-combustive internal atmosphere includes an oxygen level in said rotary tray dryer of less than about 5 volume percent.

3. The method as defined in claim 2, wherein said non-combustive internal atmosphere includes an oxygen level in said rotary tray dryer of less than about 2.44 volume percent.

4. The method as defined in claim 1, wherein said non-combustive internal atmosphere includes a hydrogen level in said rotary tray dryer of less than about 2.5 volume percent.

5. The method as defined in claim 2, wherein said non-combustive internal atmosphere includes a hydrogen level in said rotary tray dryer of less than about 2.5 volume percent.

6. The method as defined in claim 4, wherein said non-combustive internal atmosphere includes a hydrogen level in said rotary tray dryer of less than about 1 volume percent.

7. The method as defined in claim 3, wherein said non-combustive internal atmosphere includes a hydrogen level in said rotary tray dryer of less than about 1 volume percent.

8. The method as defined in claim 1, including the step of introducing a substantially inert gas into said rotary tray dryer to reduce the combustive gas volume in said rotary tray dryer.

9. The method as defined in claim 7, including the step of introducing a substantially inert gas into said rotary tray dryer to reduce the combustive gas volume in said rotary tray dryer.

10. The method as defined in claim 8, wherein said substantially inert gas includes at least a majority of argon.

11. The method as defined in claim 1, wherein at least about 75% of said liquid is removed from said post consumer scrap and/or secondary magnesium turnings in said rotary tray dryer.

12. The method as defined in claim 11, wherein at least about 90% of said liquid is removed from said post consumer scrap and/or secondary magnesium turnings in said rotary tray dryer.

13. The method as defined in claim 12, wherein at least about 90% of said liquid is removed from said post consumer scrap and/or secondary magnesium turnings in said rotary tray dryer.

14. The method as defined in claim 1, including the step of wet milling said post consumer scrap and/or secondary magnesium turnings to reduce the size of said post consumer scrap and/or secondary magnesium turnings prior to feeding said post consumer scrap and/or secondary magnesium turnings into said rotary tray dryer.

15. The method as defined in claim 13, including the step of wet milling said post consumer scrap and/or secondary magnesium turnings to reduce the size of said post consumer scrap and/or secondary magnesium turnings prior to feeding said post consumer scrap and/or secondary magnesium turnings into said rotary tray dryer.

16. The method as defined in claim 14, wherein said post consumer scrap and/or secondary magnesium turnings are reduced in size to no more than about 0.25 inch by said wet milling.

17. The method as defined in claim 1, including the step of reducing excess liquid from said post consumer scrap and/or secondary magnesium turnings prior to feeding said post consumer scrap and/or secondary magnesium turnings into said rotary tray dryer, said step of removing excess liquid including the use of a liquid separating screen, a chip wringer, a centrifuge, and combinations thereof.

18. The method as defined in claim 15, including the step of reducing excess liquid from said post consumer scrap and/or secondary magnesium turnings prior to feeding said post consumer scrap and/or secondary magnesium turnings into said rotary tray dryer, said step of removing excess liquid including the use of a liquid separating screen, a chip wringer, a centrifuge, and combinations thereof.

19. A process of reclaiming magnesium from post consumer scrap and/or secondary magnesium turnings including:
   a) continuously feeding said post consumer scrap and/or secondary magnesium turnings into a rotary tray dryer, said post consumer scrap and/or secondary magnesium turnings including magnesium and at least about 10 weight percent liquid, said liquid including water, hydrocarbon compound, or mixtures thereof;
   b) operating said rotary tray dryer having a plurality of rotary tray so as to provide an internal temperature of about 250–1150° F., a substantially non-combustive internal atmosphere, and a residence time of about 0.5–4 hours for said post consumer scrap and/or secondary magnesium turnings, said substantially non-combustive internal atmosphere including an oxygen level in said rotary tray dryer of less than about 2.44 volume percent, a hydrogen level in said rotary tray dryer of less than about 1 volume percent, and combinations thereof;
   c) flowing a substantially inert gas through said rotary tray dryer, said substantially inert gas being heated prior to being flowed through said rotary tray dryer; and,
   c) removing at least about 80% of said liquid from said post consumer scrap and/or secondary magnesium turnings.

20. The process as defined in claim 19, wherein said substantially inert gas includes at least a majority of argon.

21. The process as defined in claim 19, wherein said substantially inert gas is at least partially passed through a condenser to at least partially remove said liquid in said substantially inert gas.

22. The process as defined in claim 20, wherein said substantially inert gas is at least partially passed through a condenser to at least partially remove said liquid in said substantially inert gas.

23. The process as defined in claim 19, wherein said post consumer scrap and/or secondary magnesium turnings are wet milled to reduce the size of said post consumer scrap and/or secondary magnesium turnings prior to feeding said post consumer scrap and/or secondary magnesium turnings into said rotary tray dryer.

24. The process as defined in claim 22, wherein said post consumer scrap and/or secondary magnesium turnings are wet milled to reduce the size of said post consumer scrap and/or secondary magnesium turnings prior to feeding said post consumer scrap and/or secondary magnesium turnings into said rotary tray dryer.

25. The process as defined in claim 19, wherein excess liquid from said post consumer scrap and/or secondary magnesium turnings is removed prior to feeding said post consumer scrap and/or secondary magnesium turnings into said rotary tray dryer, said process of removing excess liquid including the use of a liquid separating screen, a chip wringer, a centrifuge, and combinations thereof.

26. The process as defined in claim 24, wherein excess liquid from said post consumer scrap and/or secondary magnesium turnings is removed prior to feeding said post consumer scrap and/or secondary magnesium turnings into said rotary tray dryer, said process of removing excess liquid including the use of a liquid separating screen, a chip wringer, a centrifuge, and combinations thereof.

27. A method of reclaiming magnesium from post consumer scrap and/or secondary magnesium turnings comprising:
    a) continuously feeding said post consumer scrap and/or secondary magnesium turnings into a rotary tray dryer, said post consumer scrap and/or secondary magnesium turnings including magnesium and a liquid that includes water and hydrocarbon compound, said rotary tray dryer including a plurality of vertically spaced trays wherein at least two of said trays rotate at substantially the same speed;
    b) operating said rotary tray dryer so as to provide an internal temperature of at least about 250° F., a substantially non-combustive internal atmosphere, and a residence time of at least about 0.5 hour for said post consumer scrap and/or secondary magnesium turnings, said substantially non-combustive internal atmosphere including an oxygen level in said rotary tray dryer of less than about 2.44 volume percent, a hydrogen level in said rotary tray dryer of less than about 1 volume percent, and combinations thereof;
    c) flowing a substantially inert gas through said rotary tray dryer, said substantially inert gas being heated prior to being flowed through said rotary tray dryer; and,
    d) removing at least about 90% of said liquid from said post consumer scrap and/or secondary magnesium turnings.

28. The method as defined in claim 27, wherein said substantially inert gas includes at least a majority of argon.

29. The method as defined in claim 27, wherein said substantially inert gas is at least partially passed through a condenser to at least partially remove said liquid in said substantially inert gas.

30. The method as defined in claim 28, wherein said substantially inert gas is at least partially passed through a condenser to at least partially remove said liquid in said substantially inert gas.

31. The method as defined in claim 27, wherein at least about 99.5% of said liquid is removed from said post consumer scrap and/or secondary magnesium turnings in said rotary tray dryer.

32. The method as defined in claim 30, wherein at least about 99.5% of said liquid is removed from said post consumer scrap and/or secondary magnesium turnings in said rotary tray dryer.

33. The method as defined in claim 27, including the step of wet milling said post consumer scrap and/or secondary magnesium turnings to reduce the size of said post consumer scrap and/or secondary magnesium turnings prior to feeding said post consumer scrap and/or secondary magnesium turnings into said rotary tray dryer.

34. The method as defined in claim 32, including the step of wet milling said post consumer scrap and/or secondary magnesium turnings to reduce the size of said post consumer scrap and/or secondary magnesium turnings prior to feeding said post consumer scrap and/or secondary magnesium turnings into said rotary tray dryer.

35. The method as defined in claim 27, wherein said post consumer scrap and/or secondary magnesium turnings are reduced in size to no more than about 0.25 inch by said wet milling.

36. The method as defined in claim 34, wherein said post consumer scrap and/or secondary magnesium turnings are reduced in size to no more than about 0.25 inch by said wet milling.

37. The method as defined in claim 27, including the step of reducing excess liquid from said post consumer scrap and/or secondary magnesium turnings prior to feeding said post consumer scrap and/or secondary magnesium turnings into said rotary tray dryer, said step of removing excess liquid including the use of a liquid separating screen, a chip wringer, a centrifuge, and combinations thereof.

38. The method as defined in claim 36, including the step of reducing excess liquid from said post consumer scrap and/or secondary magnesium turnings prior to feeding said post consumer scrap and/or secondary magnesium turnings into said rotary tray dryer, said step of removing excess liquid including the use of a liquid separating screen, a chip wringer, a centrifuge, and combinations thereof.

* * * * *